(12) United States Patent
Tamura

(10) Patent No.: US 7,313,169 B2
(45) Date of Patent: Dec. 25, 2007

(54) CDMA DEMODULATION CIRCUIT, CDMA MOBILE COMMUNICATION DEMODULATION METHOD USED THEREFOR, AND STORAGE MEDIUM RECORDING PROGRAM THEREOF

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 796 days.

(21) Appl. No.: 10/457,380

(22) Filed: Jun. 10, 2003

(65) Prior Publication Data

US 2003/0235241 A1    Dec. 25, 2003

(30) Foreign Application Priority Data

Jun. 19, 2002  (JP)  ............................. 2002-177843

(51) Int. Cl.
*H04B 1/69* (2006.01)
*H04B 1/707* (2006.01)
*H04B 1/713* (2006.01)

(52) U.S. Cl. ...................... 375/148; 375/144; 375/150; 375/142; 375/147

(58) Field of Classification Search ................ 375/144, 375/147, 148, 150, 142; 370/342; 455/506
See application file for complete search history.

(56) References Cited

U.S. PATENT DOCUMENTS

| 6,768,729 | B1 * | 7/2004 | Ohsuge | ...................... 370/342 |
| 6,996,157 | B2 * | 2/2006 | Ohsuge | ...................... 375/148 |
| 7,050,484 | B2 * | 5/2006 | Hirade | ...................... 375/148 |

FOREIGN PATENT DOCUMENTS

| EP | 1 170 876 A2 | 1/2002 |
| EP | 1 209 818 A1 | 5/2002 |
| EP | 1 229 666 A1 | 8/2002 |
| EP | 1 148 657 | 7/2003 |
| GB | 2 343 817 A | 5/2000 |
| JP | 10-190522 A | 7/1998 |
| JP | 10-336072 A | 12/1998 |
| JP | 11-196026 A | 7/1999 |
| JP | 2000-134135 A | 5/2000 |
| JP | 2001-274726 A | 10/2001 |
| JP | 2002-101019 A | 4/2002 |

* cited by examiner

*Primary Examiner*—Phuong Phu
(74) *Attorney, Agent, or Firm*—Dickstein Shapiro LLP

(57) ABSTRACT

A CDMA demodulation circuit to be adapted to fluctuation of arrival path timing and to obtain good reception characteristics, can be provided. A despreading timing correction control portion controls number of despreading timing correction candidates depending upon result of comparison in a correction value difference calculating portion. An effective path timing judgment portion makes judgment of an effective path timing on the basis of correlation peak information detected by the correlation value difference calculating portion. Respective despreading portions perform despreading at a plurality of timings including a path timing set from the effective path timing judgment portion and despreading timing correction candidates of M points before and after the set path timing. The despreading timing correcting portion determines the despreading timing correction value on the base of the results of respective despreading despreaded by the despreading portion, and feeds it back to the respective despreading portion.

19 Claims, 6 Drawing Sheets

STABLE PATH ENVIRONMENT

ARRIVAL PATH TIMING AND DELAY PROFILE CORRELATION PEAK VALUE MATCH

MULTIPLE PATH ENVIRONMENT CLOSE ARRIVAL PERIOD

ARRIVAL PATH TIMING AND DELAY PROFILE CORRELATION PEAK VALUE NOT MATCH

PATH ENVIRONMENT FLUCTUATING ARRIVAL PERIOD

ARRIVAL PATH TIMING AND DELAY PROFILE CORRELATION PEAK VALUE NOT MATCH

WHEN PEAK CORRELATION
VALUE POSITION FAR

WHEN PEAK CORRELATION
VALUE POSITION CLOSE

CDMA DEMODULATION CIRCUIT, CDMA MOBILE COMMUNICATION DEMODULATION METHOD USED THEREFOR, AND STORAGE MEDIUM RECORDING PROGRAM THEREOF

CROSS REFERENCE TO THE RELATED APPLICATION

The present application has been filed with claiming priority based on Japanese Patent Application No. 2002-177843, filed on Jun. 19, 2002. Disclosure of the above-identified Japanese Patent Application is herein incorporated by reference.

BACKGROUND OF THE INVENTION

1. Field of the Invention

The present invention relates generally to a CDMA demodulation circuit, a CDMA mobile communication demodulation method used therefor, and storage medium recording program thereof. More particularly, the invention relates to a demodulation method in CDMA (Code Division Multiple Access) mobile communication.

2. Description of the Related Art

Conventionally, in a reception process of the CDMA mobile communication, a received signal is segregated into a plurality of multiple path components having different propagation periods by despreading using spreading code replica synchronized with spreading code of the received signal. In this case, a desired wave has to be despread by spreading code replica synchronized with reception timing of the signal and has to detect reception timings of respective passes.

In this reception process, a timing of the spreading code replica in a symbol of information 1 is shifted per one chip for despreading over one symbol period to generate a power delay profile. From generated power delay profile, passes are selected in order from those having large reception power per number of rake fingers to establish a path for rake synthesis.

Since positions (delay periods) of paths to be rake synthesized are frequently fluctuated associating with movement of the mobile station, the power delay profile is regularly updated per a given interval in the receiver for also effecting updating of the rake synthesizing paths. This is to retrieve paths for rake synthesis and thus is referred to as path search.

In the demodulation circuit to be used in the reception process of the foregoing CDMA mobile communication, diversity effect is attained by the path search and rake synthesis. In a mobile communication environment, the received radio wave often becomes multiple path environment to be influenced by level fluctuation and fluctuation of arrival period to reception point. If error is caused in finger despreading timing under such sever path fluctuation, reception characteristics can be deteriorated.

Therefore, in the foregoing demodulation circuit, it is desired to search stable path among arriving paths and to effect an appropriate finger despreading timing detection process adapted to fluctuation of path arrival period.

SUMMARY OF THE INVENTION

The present invention has been worked out in view of the problems in the prior art set forth above. It is an object of the present invention to provide a CDMA demodulation circuit which can adapt to fluctuation of arrival path timing and can obtain good reception characteristics.

According to the first aspect of the present invention, a CDMA demodulation circuit performing peak search of a delay profile generated by performing correlation calculation using a known data portion of a received signal and performing despreading of the known data portion of the received signal at an effective path timing judged based on a result of peak search, comprises:

control means for adaptively controlling timing correction of the despreading depending upon proximal value of correlation peak obtained by calculation of the delay profile.

According to the second aspect of the present invention, a demodulation method in a CDMA mobile communication performing peak search of a delay profile generated by performing correlation calculation using a known data portion of a received signal and performing despreading of the known data portion of the received signal at an effective path timing judged based on a result of peak search, comprises the step of:

adaptively controlling timing correction of the despreading depending upon proximal value of correlation peak obtained by calculation of the delay profile.

According to the third aspect of the present invention, a storage medium storing a program of a demodulation method in a CDMA mobile communication performing peak search of a delay profile generated by performing correlation calculation using a known data portion of a received signal and performing despreading of the known data portion of the received signal at an effective path timing judged based on a result of peak search, the program operates a computer for performing process of calculating a difference of level between a correlation peak value of the delay profile and a correlation value proximal to the correlation peak; and process of controlling number of timing correction value candidates of the despreading using a result of calculation of the difference.

Namely, the CDMA (Code Division Multiple Access) demodulation circuit according to the present invention realizes good reception characteristics receiving stable path by adaptively controlling finger despreading timing correction depending upon level of values proximal to correlation peak obtained by calculation of a delay profile in a finger despreading process.

Discussing more particularly, the CDMA demodulation circuit according to the present invention calculates a difference of level between a correlation peak value of the delay profile and a correlation value proximal to the correlation peak in the correlation value difference calculating portion and controls number of timing correction value candidates of the despreading using a result of calculation of the difference.

Control for performing timing correction of the despreading is performed at a greater number of timings under judgment that reliability of the detected despreading timing is low when a definite correlation peak value is not present in the delay profile, namely when the difference between the correlation peak value and the correlation values proximal to the correlation peak value is small.

Control for performing timing correction of the despreading is performed at a smaller number of timings under judgment that reliability of the detected despreading timing is high when a definite correlation peak value is present in the delay profile, namely when the difference between the correlation peak value and the correlation values proximal to the correlation peak value is large.

As a result, even under a multiple path environment including fluctuation of reception point arrival timing of respective paths, it becomes possible to detect appropriate despreading timing to permit maintaining of good reception characteristics.

By this, with the present invention, by monitoring reliability of result of path timing detection from the correlation values of the delay profile and controlling despreading timing correction process, it becomes possible to perform despreading process at an appropriate timing with correcting the despreading timing, even if the path timing fluctuates. Therefore, good reception characteristics adapted to fluctuation of arrival path timing, can be obtained.

On the other hand, in the present invention, by monitoring reliability of the result of path timing detection from the delay profile correlation value and controlling despreading timing correction process so as not to perform unnecessary despreading timing correction, it becomes possible to reduce influence of erroneous detection due to despreading timing correction process. Therefore, influence of erroneous detection of path timing due to noise can be reduced to obtain good reception characteristics.

Furthermore, in the present invention, by monitoring reliability of the result of path timing detection from the delay profile correlation value and controlling despreading timing correction process so as not to perform unnecessary despreading timing correction, power consumption can be saved by eliminating unnecessary despreading timing correction process.

Preferably, an electric power level threshold value to be used upon performing timing correction of the despreading is a preliminarily set fixed value, a value determined on the basis of a maximum correlation peak value of the delay profile, a value determined on the basis of peak values of respective of the delay profiles or a value determined on the basis of an average value of those other than a detected peak value obtained by calculation of the delay profile.

Control to perform timing correction of the despreading may be effected in a direction where an appropriate despreading timing is considered to be present from a result of calculation of the difference of levels of the correlation values.

Also, it is possible to make judgment whether a definite peak is obtained or not depending upon a correlation value position obtained by calculation of the delay profile, and to perform control for performing timing control of the despreading depending upon a result of judgment.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a CDMA demodulation circuit, a CDMA mobile communication demodulation method used therefor, and storage medium recording program thereof according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
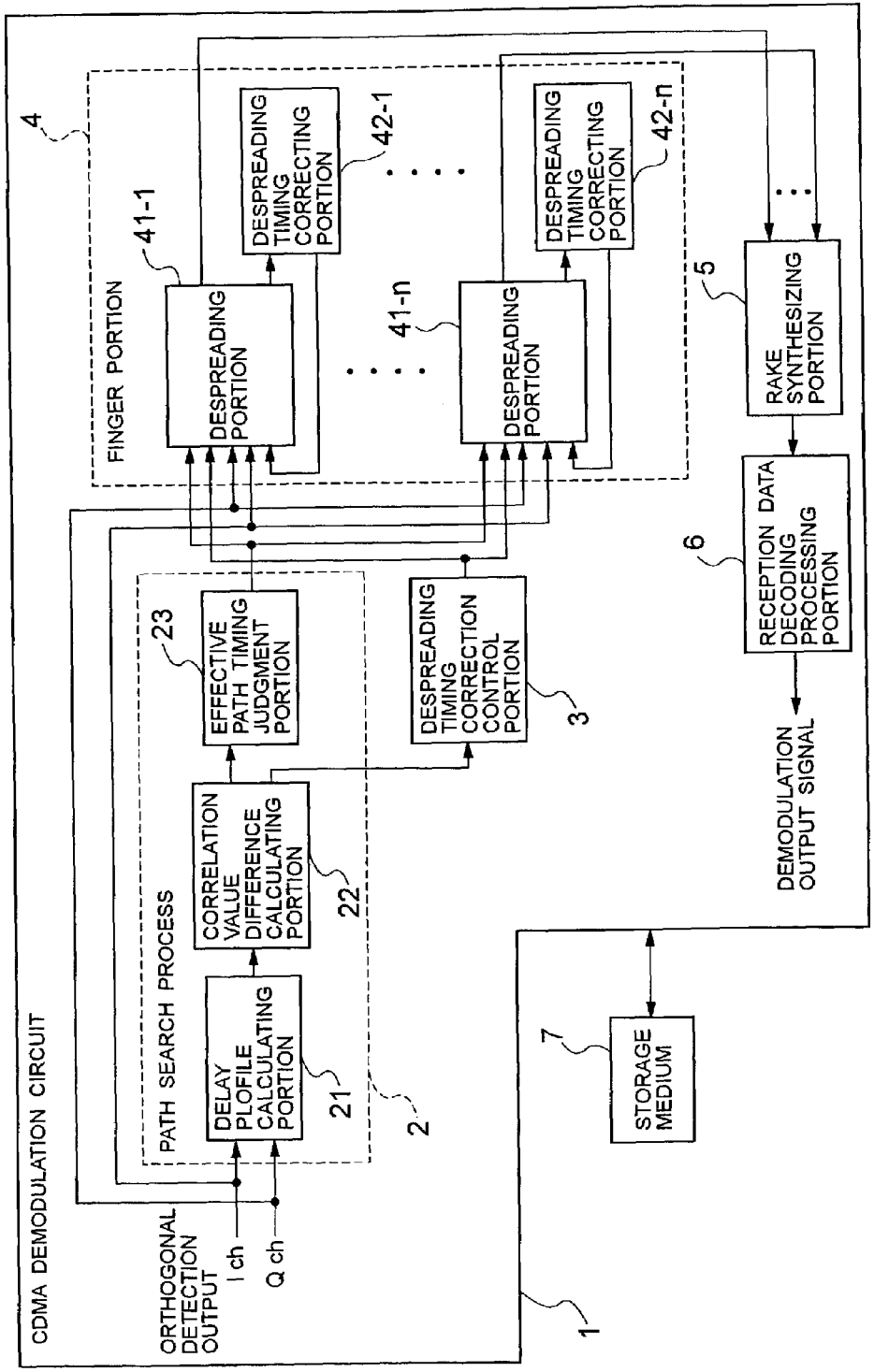
FIG. 1 is a block diagram showing a construction of one embodiment of a CDMA demodulation circuit according to the present invention.

FIG. 1 is a block diagram showing a construction of one embodiment of a CDMA (Code Division Multiple Access) demodulation circuit according to the present invention. In FIG. 1, there is shown a construction adapted to a demodulation system employing typical finger/rake of a CDMA demodulation circuit 1.

The CDMA demodulation circuit 1 is constructed with a path search processing portion 2, a despreading timing correction control portion 3, a finger portion 4, a rake synthesizing portion 5, a received data decoding processing portion 6 and a storage medium 7. The path search processing portion 2 has a delay profile calculating portion 21, a correlation value difference calculating portion 22 and an effective path timing judgment portion 23. The finger portion 4 has a despreading portions 41-1 to 41-n and a despreading timing correcting portions 42-1 to 42-n. On the other hand, in the storage medium 7, a program to be executed by a computer (not shown) upon realizing the process of the CDMA demodulation circuit 1 is recorded.

The delay profile calculating portion 21 is responsive to inputting of an I component signal and a Q component signal demodulated by orthogonal detection, to calculate the delay profile on the basis of the input signals. The correlation value difference calculating portion 22 detects a correlation peak and timing from the delay profile calculated in the delay profile calculating portion 1, and conjunction therewith performs comparison of the peak value and a correlation value proximity to the peak value. The despreading timing correction control portion 3 controls number of despreading timing correction candidates depending upon the result of comparison in the correlation value difference calculating portion 22.

On the other hand, the effective path timing judgment portion 23 makes judgment of an effective path timing on the basis of a correlation peak information detected by the correlation value difference calculating portion 22. Respective despreading portions 41-1 to 41-n of the finger portion 4 performs despreading at a plurality of timings including the path timing set from the effective path timing judgment portion 23 and despreading timing correction candidates at M points before and after the set path timing. The despreading timing correcting portions 42-1 to 42-n determine despreading timing correction values from the results of despreading in respective of despreading portions 41-1 to 41-n and feed back the determined despreading timing correction values to the despreading portions 41-1 to 41-n. Reception data despread by the despreading timing correction values of the despreading portions 41-1 to 41-n are synthesized by the rake synthesizing portion 5 and then demodulated by the reception data decoding processing portion 6.

Despreading timing correction process per se is well known process and is a technology for adapting to reception path arrival timing fluctuation in mobile communication. Normally, the delay profile in the delay profile calculating portion 21 enhances reliability of the result of detection by providing sufficient averaging process for equalizing deterioration by fading in order to reduce erroneous detection of the path timing. Therefore, it takes a time in delay profile calculation adapting to timing fluctuation.

In order to enhance adaptability, the despreading portions 41-1 to 41-n perform despreading with respect to the timings of M points before and after the despreading timing designated from the effective path timing judgment portion 23 and then perform despreading timing correction by re-detecting the correlation value peak in time. It should be noted that correction process gives importance for adaptability and can use only data having short time interval to easily cause erroneous detection of path timing due to noise or the like.

In the shown embodiment, erroneous detection can be reduced with maintaining path timing adaptability through correction process by adaptive control of the despreading timing correction process by the despreading timing correction control portion 3.

Operation of the shown embodiment of the CDMA demodulation circuit 1 according to the present invention will be discussed with reference to FIG. 1.

When the I component signal and the Q component signal demodulated by orthogonal detection are input, the delay profile calculating portion 21 performs correlation calculation using known data portion of the reception signal and generates the delay profile averaged with an averaging process period T1 by performing in-phase addition and electric power addition.

In the correlation value difference calculating portion 22, peak search of the delay profile generated by the delay profile calculating portion 21 is performed to perform calculation of a difference between the correlation peak level and the correlation level of 2× sample proximity of the peak value. The correlation peak level and the peak timing detected by the correlation value difference calculating portion 22 are input to the effective path timing judgment portion 23 to make judgment of the effective path timing with taking the level threshold value and number of protection stages on the basis thereof.

At the effective path timing and timings at M points before and after the effective path timing, the despreading portions 41-1 to 41-n performs despreading of the known data portion of the reception signal. In the despreading timing judgment portion 42-1 to 42-n, peak is detected again from the correlation value averaged by an average processing period T2 (<T1) at M+1 points as outputs of the despreading portions 41-1 to 41-n for feeding back a maximum peak detection timing to the despreading portions 41-1 to 41-n as correction despreading timing. The despreading timing correction process enhances adaptability to arrival path timing fluctuation by setting T1>T2.

The reception signal despread at the correction despreading timing is synthesized by the rake synthesizing portion 5 in order to obtain path diversity effect. After rake synthesis, the reception data is decoded by the reception data coding processing portion 6.

In the shown embodiment, by inputting a difference information between the peak value calculated by the correlation value difference calculating portion 22 and the correlation value proximity to the peak value, to the despreading timing correction control portion 3, the dispreading timing correction control portion 3 controls number M of despreading timing correction on the dispreading portions 41-1 to 41-n to be M±N (M and N are positive integers) on the base of the difference information.

Figure 2A:
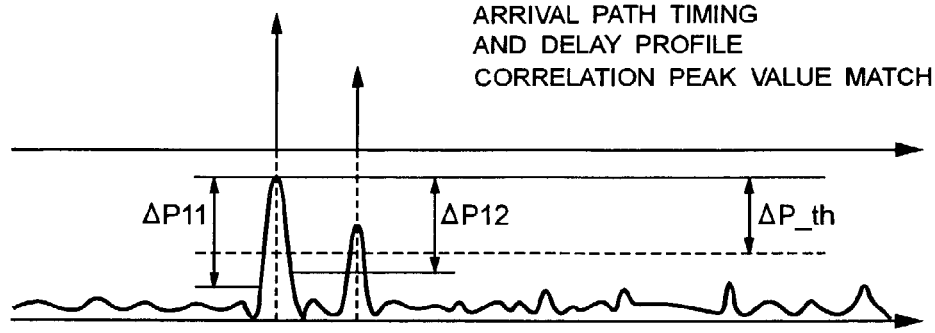
FIG. 2A is an illustration showing a waveform in a stable path environment.
Figure 2B:
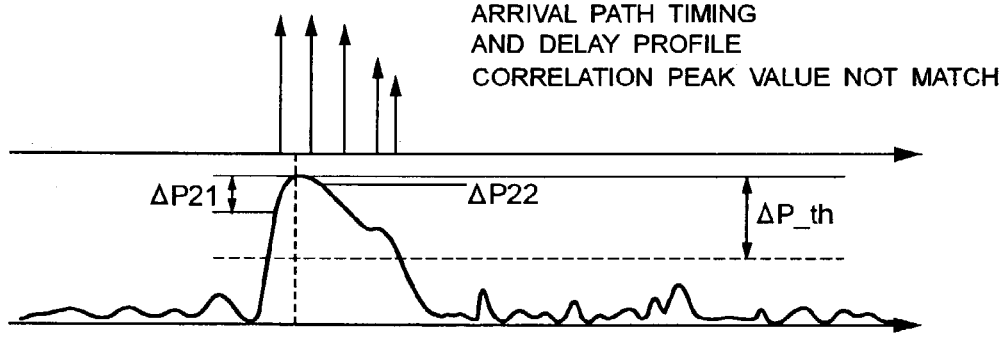
FIG. 2B is an illustration showing a waveform in a multiple path environment where arrival periods are close to each other.
Figure 2C:
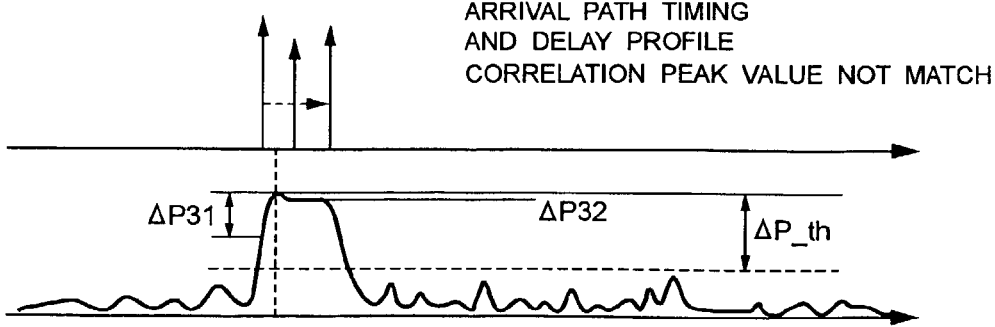
FIG. 2C is an illustration showing a waveform in a path environment fluctuation arrival periods.

FIG. 2A is an illustration showing a waveform in a stable path environment, FIG. 2B is an illustration showing a waveform in a multiple path environment where arrival periods are close to each other, and FIG. 2C is an illustration showing a waveform in a path environment fluctuation arrival periods.

Figure 3A:
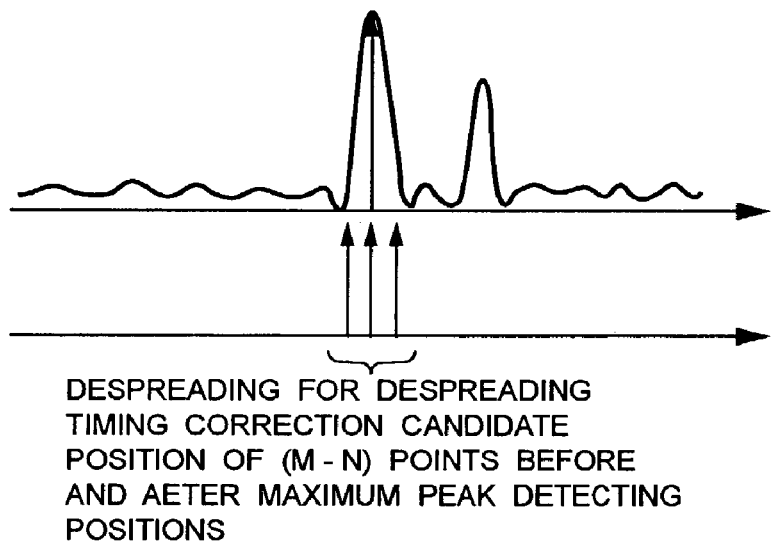
FIG. 3A is an illustration showing a waveform of the case where definite correlation peak is detected.
Figure 3B:
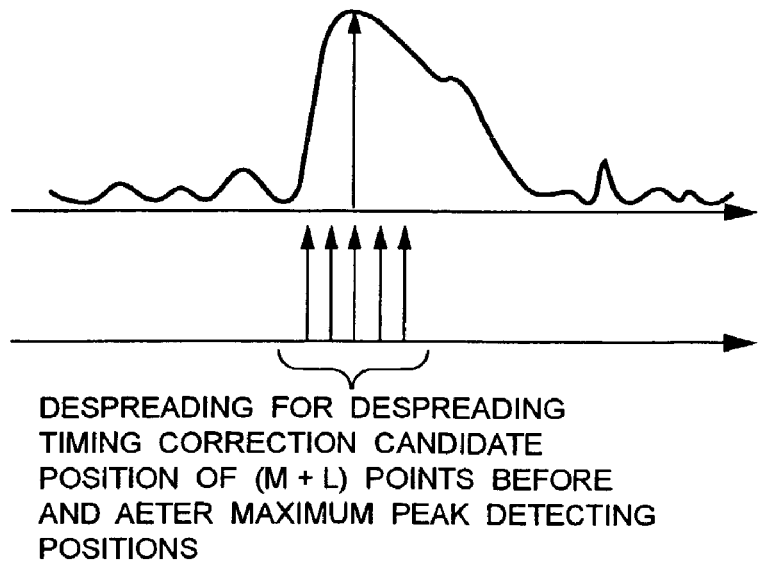
FIG. 3B is an illustration of a waveform of the case where definite correlation peak cannot be detected.

On the other hand, FIG. 3A is an illustration showing a waveform of the case where definite correlation peak is detected, and FIG. 3B is an illustration of a waveform of the case where definite correlation peak cannot be detected. Discussion will be given hereinafter for despreading timing correction control with reference to FIGS. 2A to 2C and FIGS. 3A and 3B.

When arrival path period is stable and arrival timings of respective paths are different (see FIG. 2A), influence of noise or fading can be reduced by in-phase addition and electric power average of the delay profile. Thus, definite correlation value peaks of respective paths appear. Therefore, probability that the effective path timing judgment result by detection of the delay profile peak matches with the arrival path timing, is high, and a level difference between the maximum correlation peak value and proximal value of the peak value becomes large.

Performing despreading timing correction process giving importance for adaptability to path fluctuation under such stable path environment can be a factor of erroneous detection of path timing by re-detection of correlation value peak with lesser averaging process, namely with large influence of noise or the like.

On the other hand, under the environment where a plurality of paths arrives at substantially the same timing (see FIG. 2B) or under the environment where arrival timing of the same path is fluctuation by mobile communication (see FIG. 2C), it is difficult to separate peak of correlation value of each path even by performing averaging of delay profile. Therefore, no definite peak may appear. Therefore, probability that the peak timing of the delay profile matches with the arrival path timing, is low, and level difference between the maximum correlation peak value and the proximal value of the peak value becomes small.

Under the environment shown in FIG. 2B, detection of definite correlation peak is difficult even when despreading timing correction process is performed. The environment where as plurality of paths arrives at equal level and equal timing is under environment of complicate propagation path where no line-in-sight propagation is present. Under such environment, it is considered to easily cause fluctuation of arrival path timing. Therefore, path adaptability becomes important. Under the environment shown in FIG. 2C, since path timing is moving, importance of path adaptability becomes clear.

In the shown embodiment, comparison of the delay profile correlation peak value and the correlation value level proximal to the peak, is performed by the despreading timing correction control portion 3. When difference is large, judgment is made that probability that the correlation peak valve matches with the arrival path timing, to perform control for reducing number of timing correction candidates.

When the difference between the correlation peak value and the correlation value level proximal thereto is small, judgment is made that probability of matching of the correlation peak value and the arrival path timing is low, to perform control to increase number of timing correction candidates (see FIG. 3B).

By these control, it becomes possible to reduce erroneous detection of path timing, perform despreading timing correction process adaptable to path timing fluctuation and realize good reception characteristics.

Figure 4:
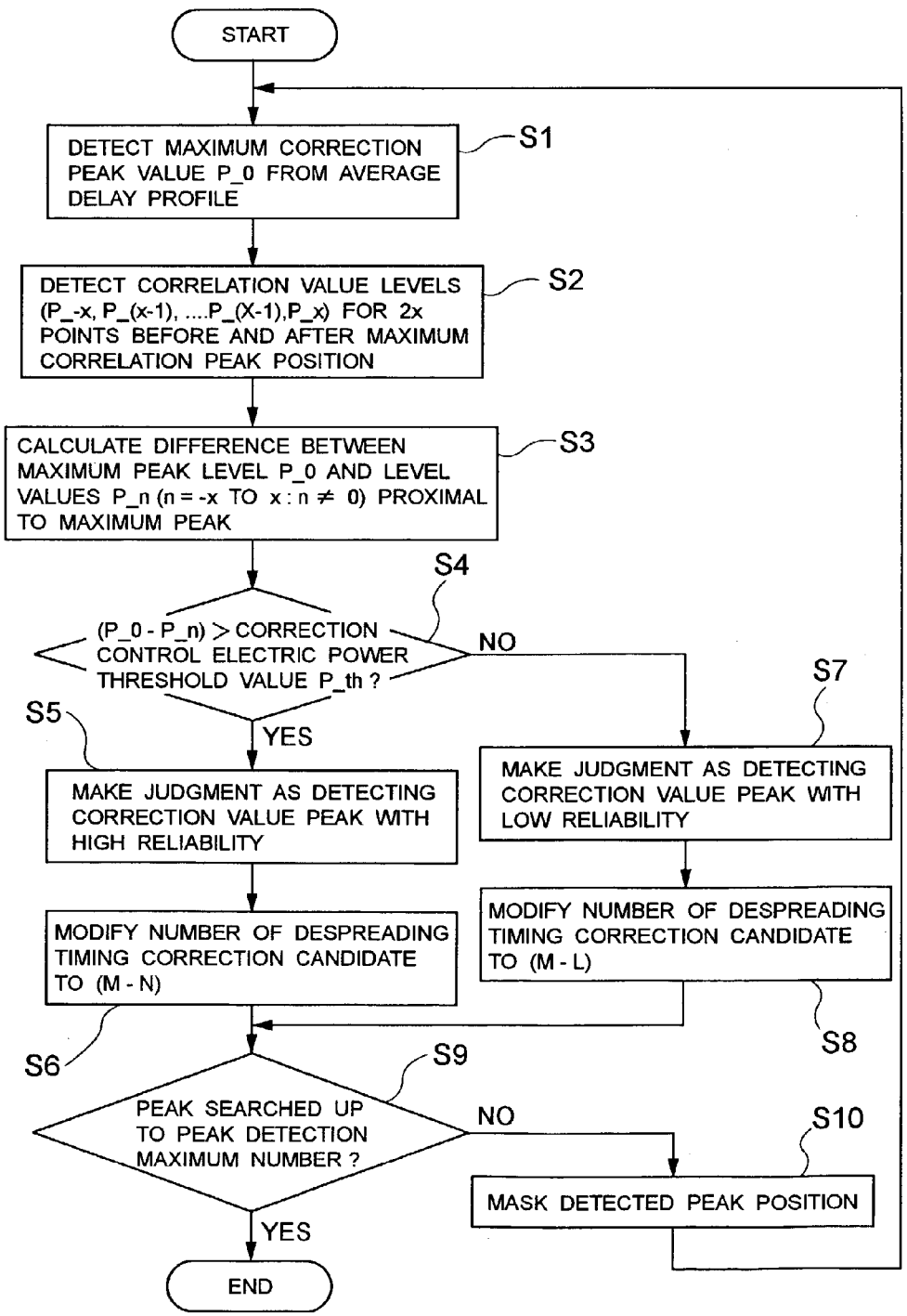
FIG. 4 is a flowchart showing operation of one embodiment of the CDMA demodulation circuit according to the present invention.

FIG. 4 is a flowchart showing operation of the shown embodiment of the CDMA demodulation circuit 1 according to the present invention. The despreading timing correction control operation in the shown embodiment of the CDMA demodulation circuit 1 according to the present invention will be discussed with reference to FIG. 1, FIGS. 2A to 2C and FIG. 4. It should be noted that the process shown in FIG. 4 is realized by executing a program stored in the storage medium 7 by the computer.

At first, the CDMA demodulation circuit 1 detects the correlation peak position and level P_0 from the average delay profile (step S1 of FIG. 4). Also, the CDMA demodulation circuit 1 detects the correlation levels P_n (n=−x to x, n≠0) per x points before and after the detected peak position (step S2 of FIG. 4).

The CDMA demodulation circuit 1 calculates level difference ΔP of detected P_0 and P_n (step S3 of FIG. 4) and compares the calculated level difference ΔP with an electric power threshold value ΔP_th for determining correction control operation (step S4 of FIG. 4).

Here, the electric power threshold value ΔP_th for determining the despreading timing correction process can be set by a method preliminarily determining at a fixed value, a method determining on the basis of maximum correlation peak value of the delay profile (a value of xdB from the maximum peak value or so forth), a method determining on the basis of the peak values of respective delay profile (if peak search is performed for Y times, there are Y in number of threshold values, when the peak P0 is detected, the threshold value for the correlation value proximal to P0 is xdB higher or lower than the level of P0, or so forth), or a method determining based on an average value other than the detected peak value obtained by delay profile calculation (corresponding to interference level or noise level) (for example, a value greater than the average value by xdB or more, or so forth).

If the result of foregoing comparison is ΔP>ΔP_th as shown in FIG. 2A, the CDMA demodulation circuit 1 makes judgment that the detected correlated peak position is definite peak value and is highly reliable as appropriate despreading timing (step S5 of FIG. 4). Subsequently, the CDMA demodulation circuit 1 controls the despreading timing correction process to reduce number of candidate timing for performing correction process to (M−N) in order to reduce erroneous detection timing by despreading timing correction process (step S6 of FIG. 4).

In contrast to this, as shown in FIGS. 2B and 2C, the CDMA demodulation circuit 1 makes judgment that reliability of the detected correlation peak position is low as appropriate despreading timing if ΔP≦ΔP_th at step S4 (step S7 of FIG. 4) and controls the despreading timing correction process for increasing number of candidate timing for performing despreading timing correction process to (M+L) (L is positive integer) (step S8 of FIG. 4).

Finally, the CDMA demodulation circuit 1 makes judgment whether peak search has been performed up to the maximum number of peak detection (step S9 of FIG. 4). If maximum number of peak search has not yet been done, proximal positions of the already detected correlation peaks are masked (step S10 of FIG. 4) to restart detection of correlation peak returning to step S12. When peak search has already been done up to the maximum times, the CDMA demodulation circuit 1 terminates the foregoing process.

As set forth above, in the shown embodiment, by monitoring reliability of the result of path timing detection from the delay profile correlation value and controlling despreading timing correction process, it becomes possible to perform despreading process at an appropriate timing by correcting the despreading timing even when path timing is fluctuated. Therefore, good reception characteristics can be obtained adapting to fluctuation of arrival path timing.

On the other hand, in the shown embodiment, by monitoring reliability of the result of path timing detection from the delay profile correlation value and controlling despreading timing correction process so as not to perform unnecessary despreading timing correction, it becomes possible to reduce influence of erroneous detection due to despreading timing correction process. Therefore, influence of erroneous detection of path timing due to noise can be reduced to obtain good reception characteristics.

Furthermore, in the shown embodiment, by monitoring reliability of the result of path timing detection from the delay profile correlation value and controlling despreading timing correction process so as not to perform unnecessary despreading timing correction, power consumption can be saved by eliminating unnecessary despreading timing correction process.

Figure 5:
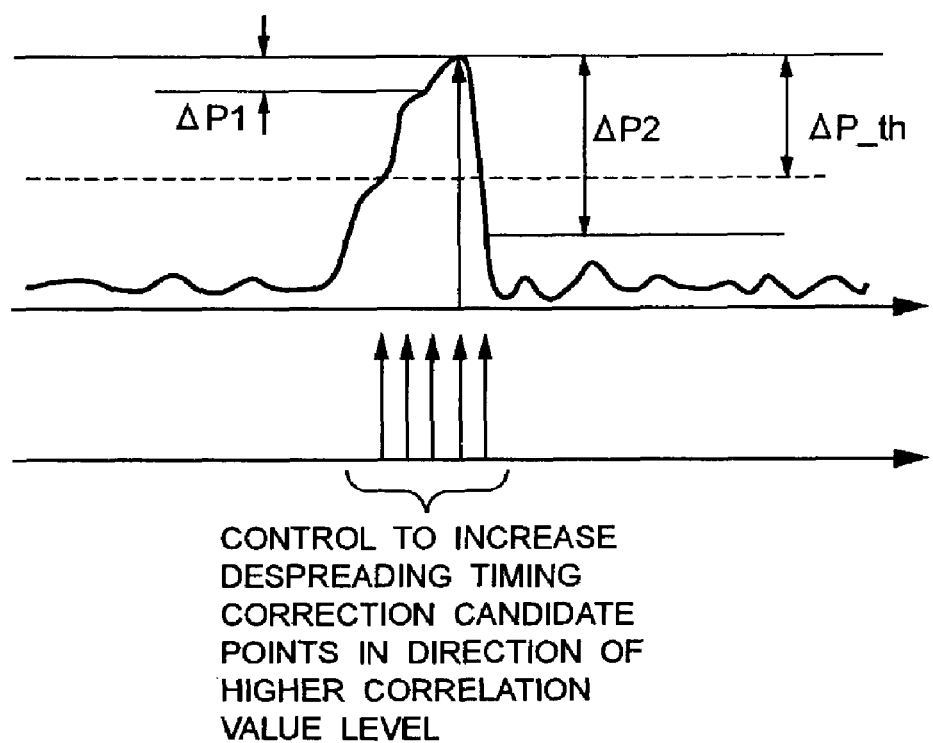
FIG. 5 is an illustration for explaining a despreading timing correction control in another embodiment of the present invention.

FIG. 5 is an illustration for explaining another embodiment of despreading timing correction control according to the present invention. Another embodiment of the despreading timing correction control according to the present invention will be discussed with reference to FIG. 5.

While discussion has been given for increasing and decreasing of the despreading timing correction candidates relative to the maximum correlation peak position is illustrated in FIGS. 3A and 3B, it is also possible to perform despreading timing correction control in a direction toward a timing to be considered as appropriate despreading timing from the result of correlation value difference. In another embodiment of the despreading timing correction control according to the present invention, this control method is employed. This control method will be discussed hereinafter with reference to FIG. 5.

As a result of calculation of difference between the maximum correlation peak level and the correlation level proximal to the peak, the level difference with the correlation value before the maximum correlation peak position in time is taken ΔP1 and the level difference with the correlation value after the maximum correlation peak position in time is taken as ΔP2. Respective of these level differences ΔP1 and ΔP2 are compared with a correction control electric power threshold value ΔP_th. As a result, when ΔP<A_th and ΔP2>ΔP_th, judgment is made that a plurality paths arrive at timings before the maximum correlation peak position or paths are shifted to the timing before the maximum correlation peak position to perform control for increasing number of despreading timing correction candidates in the direction where the correlation level difference is smaller than ΔP_th. As a result, more effective despreading timing correction control can be realized.

Figure 6A:
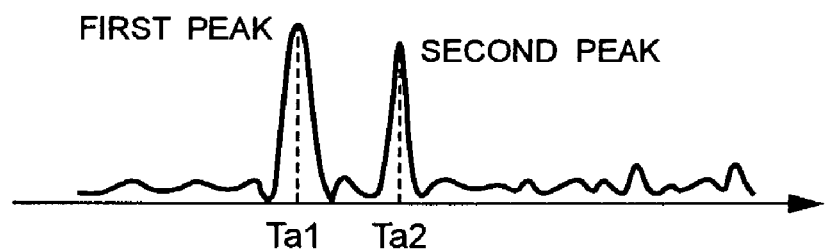
FIGS. 6A and 6B are illustrations for explaining a further embodiment of despreading timing correction control according to the present invention.
Figure 6B:
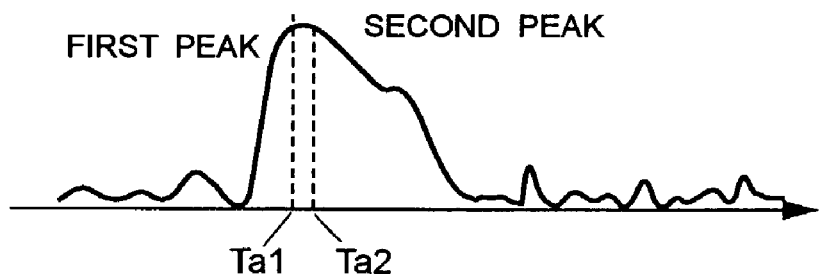

FIGS. 6A and 6B are illustrations for explaining a further embodiment of despreading timing correction control according to the present invention. Discussion will be given for another embodiment of the despreading timing correction control according to the present invention with reference to FIGS. 6A and 6B. FIG. 6A shows a waveform of the case where the peak correlation position is far, and FIG. 6B shows a waveform of the case where the peak correlation position is close.

It is possible to perform despreading timing correction control by making judgment whether the definite peak or not based on the correlation value position instead of the correlation value level. In a further embodiment of the despreading timing correction control according to the present invention, this control method is employed. Hereinafter, this control method will be discussed with reference to FIGS. 6A and 6B.

Normally, in order to obtain diversity effect in the CDMA mobile communication, a plurality of peaks are detected from the delay profile to perform rake synthesis relating to the peak timing which is judged as effective path. FIGS. 6A and 6B show the case where peak detection is performed twice.

In the case where definite peak is detected as shown in FIG. 6A, the level difference between the peak correlation value and the correlation value proximal to the peak correlation value becomes large. Therefore, when a plurality of peaks are detected, a timing difference between the maximum correlation peak timing Ta1 and the second correlation peak timing Ta2 becomes large.

When definite peak is not detected as shown in FIG. 6B, level difference between the peak correlation value and the correlation value proximal to the peak correlation value becomes small. Therefore, when a plurality of peaks are detected, a timing difference between the maximum correlation peak timing Ta1 and the second correlation peak timing Ta2 becomes small.

Accordingly, by setting a timing difference threshold value ΔTa and comparing the timing difference threshold value ΔTa with (Ta1−Ta2), control is performed so that number of despreading timing correction candidates is reduced when (Ta1−Ta2)>ΔTa and number of despreading timing correction candidates is increased when (Ta1−Ta2)<ΔTa. By this, similarly to the case where the level difference with the correlation value is used, the despreading timing correction control can be realized.

As set forth above, with the present invention, it becomes possible to adapt to fluctuation of arrival timing and to obtain good reception characteristics by adaptively controlling despreading timing correction depending upon proximal values of the correlation peak obtained through calculation of the delay profile in the CDMA demodulation circuit performing peak search of the delay profile generated by performing correlation calculation using the known data portion of the received signal and performing despreading of known data portion of the received signal at the effective path timing judged on the basis of the result of peak search.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A CDMA demodulation circuit performing peak search of a delay profile generated by performing correlation calculation using a known data portion of a received signal and performing despreading of said known data portion of said received signal at an effective path timing judged based on a result of peak search, comprising:

control means for adaptively controlling a number of timings to be used in timing correction of said despreading based upon a relationship between a correlation peak obtained by calculation of said delay profile and a correlation level of a sample in proximity to the correlation peak.

2. A CDMA demodulation circuit performing peak search of a delay profile generated by performing correlation calculation using a known data portion of a received signal and performing despreading of said known data portion of said received signal at an effective path timing judged based on a result of peak search, comprising:

control means for adaptively controlling timing correction of said despreading depending upon proximal value of correlation peak obtained by calculation of said delay profile, wherein said control means comprises:

correlation value difference calculating means for calculating a difference of level between a correlation peak value of said delay profile and a correlation value proximal to said correlation peak; and despreading timing correction control means for controlling number of timing correction value candidates of said despreading using a result of calculation of the difference.

3. A CDMA demodulation circuit as set forth in claim 2, wherein said despreading timing correction control means performs control for performing timing correction of said despreading at a greater number of timings when the difference between said correlation peak value and the correlation values proximal to said correlation peak value is small, and performs control for performing timing correction of said despreading at a smaller number of timings when the difference between said correlation peak value and the correlation values proximal to said correlation peak value is large.

4. A CDMA demodulation circuit as set forth in claim 1, wherein an electric power level threshold value to be used upon performing timing correction of said despreading is a preliminarily set fixed value.

5. A CDMA demodulation circuit as set forth in claim 1, wherein an electric power level threshold value to be used upon performing timing correction of said despreading is a value determined on the basis of a maximum correlation peak value of said delay profile.

6. A CDMA demodulation circuit as set forth in claim 1, wherein an electric power level threshold value to be used upon performing timing correction of said despreading is a value determined on the basis of peak values of respective of said delay profiles.

7. A CDMA demodulation circuit as set forth in claim 1, wherein an electric power level threshold value to be used upon performing timing correction of said despreading is a value determined on the basis of an average value of those other than a detected peak value obtained by calculation of said delay profile.

8. A CDMA demodulation circuit as set forth in claim 2, wherein said control means performs control to perform timing correction of said despreading in a direction where an appropriate despreading timing is considered to be present from a result of calculation of said difference of levels of said correlation values.

9. A CDMA demodulation circuit as set forth in claim 1, wherein said control means performs judgment whether a definite peak is obtained or not depending upon a correlation value position obtained by calculation of said delay profile, and performs control for performing timing control of said despreading depending upon a result of judgment.

10. A demodulation method in a CDMA mobile communication performing peak search of a delay profile generated by performing correlation calculation using a known data portion of a received signal and performing despreading of said known data portion of said received signal at an effective path timing judged based on a result of peak search, comprising the step of:
  adaptively controlling a number of timings to be used in timing correction of said despreading depending upon based upon a relationship between a correlation peak obtained by calculation of said delay profile and a correlation level of a sample in proximity to the correlation peak.

11. A demodulation method in a CDMA mobile communication performing peak search of a delay profile generated by performing correlation calculation using a known data portion of a received signal and performing despreading of said known data portion of said received signal at an effective path timing judged based on a result of peak search, comprising the step of:
  adaptively controlling timing correction of said despreading depending upon proximal value of correlation peak obtained by calculation of said delay profile, wherein said step comprises:
  step of calculating a difference of level between a correlation peak value of said delay profile and a correlation value proximal to said correlation peak; and
  step of controlling number of timing correction value candidates of said despreading using a result of calculation of the difference.

12. A demodulation method in a CDMA mobile communication as set forth in claim 11, wherein, in said step of controlling number of timing correction value candidates, control is performed for performing timing correction of said despreading at a greater number of timings when the difference between said correlation peak value and the correlation values proximal to said correlation peak value is small, and control is performed for performing timing correction of said despreading at a smaller number of timings when the difference between said correlation peak value and the correlation values proximal to said correlation peak value is large.

13. A demodulation method in a CDMA mobile communication as set forth in claim 10, wherein an electric power level threshold value to be used upon performing timing correction of said despreading is a preliminarily set fixed value.

14. A demodulation method in a CDMA mobile communication as set forth in claim 10, wherein an electric power level threshold value to be used upon performing timing correction of said despreading is a value determined on the basis of a maximum correlation peak value of said delay profile.

15. A demodulation method in a CDMA mobile communication as set forth in claim 10, wherein an electric power level threshold value to be used upon performing timing correction of said despreading is a value determined on the basis of peak values of respective of said delay profiles.

16. A demodulation method in a CDMA mobile communication as set forth in claim 10, wherein an electric power level threshold value to be used upon performing timing correction of said despreading is a value determined on the basis of an average value of those other than a detected peak value obtained by calculation of said delay profile.

17. A demodulation method in a CDMA mobile communication as set forth in claim 11, wherein said control means performs control to perform timing correction of said despreading in a direction where an appropriate despreading timing is considered to be present from a result of calculation of said difference of levels of said correlation values.

18. A demodulation method in a CDMA mobile communication as set forth in claim 10, wherein said control means performs judgment whether a definite peak is obtained or not depending upon a correlation value position obtained by calculation of said delay profile, and performs control for performing timing control of said despreading depending upon a result of judgment.

19. A storage medium storing a program of a demodulation method in a CDMA mobile communication performing peak search of a delay profile generated by performing correlation calculation using a known data portion of a received signal and performing despreading of said known data portion of said received signal at an effective path timing judged based on a result of peak search, said program operating a computer for performing
  process of calculating a difference of level between a correlation peak value of said delay profile and a correlation value proximal to said correlation peak; and
  process of controlling number of timing correction value candidates of said despreading using a result of calculation of the difference.

* * * * *